United States Patent
Li

(10) Patent No.: US 8,428,321 B2
(45) Date of Patent: Apr. 23, 2013

(54) MEDICAL IMAGE PROCESSING APPARATUS AND METHOD, AS WELL AS PROGRAM

(75) Inventor: Yuanzhong Li, Kanagawa-Ken (JP)

(73) Assignee: Fujifilm Corporation, Tokyo (JP)

( * ) Notice: Subject to any disclaimer, the term of this patent is extended or adjusted under 35 U.S.C. 154(b) by 271 days.

(21) Appl. No.: 13/016,082

(22) Filed: Jan. 28, 2011

(65) Prior Publication Data
US 2011/0243404 A1  Oct. 6, 2011

(30) Foreign Application Priority Data

Mar. 30, 2010 (JP) ................................. 2010-076602

(51) Int. Cl.
*G06K 9/00* (2006.01)

(52) U.S. Cl.
USPC .......................................................... 382/128

(58) Field of Classification Search ........... 382/128, 382/131, 132
See application file for complete search history.

(56) References Cited

U.S. PATENT DOCUMENTS

| | | | |
|---|---|---|---|
| 6,987,833 B2 * | 1/2006 | Du et al. ...................... | 378/98.9 |
| 7,583,779 B2 * | 9/2009 | Tkaczyk et al. .................. | 378/4 |
| 7,787,679 B2 * | 8/2010 | Wegenkittl et al. ........... | 382/128 |
| 2007/0237380 A1 * | 10/2007 | Iwase et al. .................... | 382/131 |

FOREIGN PATENT DOCUMENTS

| | | |
|---|---|---|
| JP | 2002-253539 | 9/2002 |
| JP | 2009-178493 | 8/2009 |

OTHER PUBLICATIONS

Translation of Siemens Special -inNavi Suite—The 1st Definition Symposium Report-Session II Dual Energy Imaging, pp. 1-2.*
Siemens Special—inNavi Suite—The 1st Definition Symposium Report—Session II Dual Energy Imaging—pp. 1-8 [on-line], Nov. 2009 [Retrieved on Jan. 6, 2011]. Retrieved from the Internet: http://www.innervision.co.jp/suite/siemens/supplement/0911/s201/.

* cited by examiner

*Primary Examiner* — Matthew Bella
*Assistant Examiner* — Dennis Rosario
(74) *Attorney, Agent, or Firm* — Young & Thompson

(57) ABSTRACT

An analysis purpose of first and second medical images, which are obtained by carrying out dual energy imaging using two types of radiations having different energies, is determined. A composition ratio of the first and second medical images depending on the determined analysis purpose is determined with referencing a composition ratio table, which indicates different composition ratios of the first and second medical images associated with different analysis purposes. Then, the first and second medical images are combined at the determined composition ratio to generate a composite image.

8 Claims, 3 Drawing Sheets

| ANALYSIS PURPOSE | α(HD(%)) | β(LD(%)) | T0 |
|---|---|---|---|
| BONE EXTRACTION | 90 | 10 | |
| LIVER EXTRACTION | 70 | 30 | |
| LUNG ANALYSIS | 20 | 80 | |
| ⋮ | ⋮ | ⋮ | |
| ⋮ | ⋮ | ⋮ | |

MEDICAL IMAGE PROCESSING APPARATUS AND METHOD, AS WELL AS PROGRAM

BACKGROUND OF THE INVENTION

1. Field of the Invention

The present invention relates to a medical image processing apparatus, a medical image processing method, and a medical image processing program for processing medical images obtained by dual energy imaging.

2. Description of the Related Art

Along with advancement of medical devices (such as multi-detector CT apparatuses) in recent years, high-quality three-dimensional images are beginning to be used for imaging diagnosis. A three-dimensional image is formed by a number of two-dimensional tomographic images and thus has a large amount of information. Therefore, it may take time for a doctor to find and diagnose a desired observation site. To address this problem, various techniques have been proposed to enhance visibility of the entire structure, and further a lesion contained in the structure, by recognizing a structure of interest, and generating, from a three-dimensional image containing the structure of interest, a three-dimensional image of the structure of interest with using, for example, a method such as maximum intensity projection (MIP) and minimum intensity projection (MinIP) to achieve MIP display, to achieve volume rendering (VR) display of the three-dimensional image, or to achieve CPR (Curved Planer Reconstruction) display (i.e., pseudo three-dimensional display).

On the other hand, as a technique to achieve substance separation in tomographic images of a subject, a technique using dual energy imaging has been known. This technique uses characteristics of substances that X-ray absorptions of substances vary depending not only on the type of each substance but also on the X-ray energy. In this technique, a subject is imaged with a CT apparatus using two types of X-rays having different energy distributions, and pixel values (CT values) of corresponding pixels between the thus obtained two types of tomographic images are compared with each other to separate substances contained in the tomographic images. For example, a technique proposed in Japanese Unexamined Patent Publication No. 2009-178493 (which will hereinafter be referred to as Patent Document 1) involves obtaining high-energy tomographic images and low-energy tomographic images by dual energy imaging with switching the voltage of the X-ray tube between a high voltage and a low voltage, and separating substances contained in the images based on a ratio between corresponding pixel values of the high-energy tomographic image and the low-energy tomographic image.

It is known that, by carrying out addition or subtraction between the high-energy tomographic image and the low-energy tomographic image obtained by dual energy imaging, a composite image where a bone and a calcified lesion are enhanced, or a composite image where a soft tissue is enhanced can be obtained. The high-energy tomographic image obtained by dual energy imaging has low contrast and low noise. In contrast, the low-energy tomographic image has high contrast and high noise. Therefore, when a composite image is obtained, the user, who is a doctor to read the composite image, generates the composite image with controlling the composition ratio for addition of the high-energy tomographic image and the low-energy tomographic image so that image quality that facilitates recognition of a desired tissue, such as a tumor, is achieved.

Further, a technique involving displaying a plurality of composite images obtained by combining the high-energy tomographic image and the low-energy tomographic image at different composition ratios and allowing the user to select one of the composite images having desired image quality has been proposed (see S. Kitano, "Dual Energy Imaging—abdominal region—", Inner Vision, supplement of the November issue, 2009, which will hereinafter be referred to as Non-patent Document 1). According to the technique disclosed in Non-patent Document 1, the user can select one of the composite images having desired image quality with comparing the composite images.

However, the technique of generating a composite image with controlling the composition ratio of the high-energy tomographic image and the low-energy tomographic image requires the user to change the composition ratio and check the generated composite image by trial and error, and thus imposes a large burden on the user. Further, the technique disclosed in Non-patent Document 1 generates a plurality of composite images, and thus requires the user to read all the generated composite images to select one having desired image quality. This also imposes a large burden on the user.

SUMMARY OF THE INVENTION

In view of the above-described circumstances, the present invention is directed to allowing obtaining a composite image of medical images, such as a high-energy tomographic image and a low-energy tomographic image obtained by dual energy imaging, in a simple manner.

An aspect of the medical image processing apparatus according to the invention includes: analysis purpose determining means for determining an analysis purpose of first and second medical images, the first and second medical images being obtained by carrying out dual energy imaging using two types of radiations having different energies;

composition ratio storage means for storing a composition ratio table indicating different composition ratios of the first and second medical images associated with different analysis purposes;

composition ratio determining means for determining a composition ratio of the first and second medical images depending on the determined analysis purpose with referencing the composition ratio table; and combining means for combining the first and second medical images at the determined composition ratio to generate a composite image.

In the medical image processing apparatus according to the invention, the analysis purpose determining means may recognize a part contained in at least one of the first and second medical images, and determine the analysis purpose based on a result of the recognition.

In the medical image processing apparatus according to the invention, the analysis purpose determining means may obtain associated information added to at least one of the first and second medical images, and determine the analysis purpose based on the associated information.

In the medical image processing apparatus according to the invention, in a case where the composite image is used for comparative reading and a comparative image used for comparison is obtained by an imaging operation other than the dual energy imaging, the composition ratio determining means may determine the composition ratio of the first and second medical images depending on a radiation energy used to obtain the comparative image, instead of determining the composition ratio depending on the determined analysis purpose.

In the medical image processing apparatus according to the invention, in a case where the composite image is used for comparative reading and a comparative image used for comparison is obtained by the dual energy imaging, the composition ratio determining means may determine the composition ratio of the first and second medical images to be the same as a composition ratio used to obtain the comparative image, instead of determining the composition ratio depending on the determined analysis purpose.

The medical image processing apparatus according to the invention may further include display control means for carrying out pseudo three-dimensional display of the composite image.

An aspect of the medical image processing method according to the invention includes the steps of:

determining an analysis purpose of first and second medical images, the first and second medical images being obtained by carrying out dual energy imaging using two types of radiations having different energies;

determining a composition ratio of the first and second medical images depending on the determined analysis purpose with referencing a composition ratio table, the composition ratio table indicating different composition ratios of the first and second medical images associated with different analysis purposes; and combining the first and second medical images at the determined composition ratio to generate a composite image.

The medical image processing method according to the invention may be provided in the form of a program to cause a computer to carry out the medical image processing method.

According to the invention, an analysis purpose of the first and second medical images is determined, a composition ratio of the first and second medical images depending on the determined analysis purpose is determined with referencing a composition ratio table, which indicates different composition ratios of the first and second medical images associated with different analysis purposes, and the first and second medical images are combined at the determined composition ratio to generate a composite image. Therefore, the user does not need to change the composition ratio by trial and error, or to select a desired composite image from composite images generated at different composition ratios. Thus, the composite image can be obtained in a simple manner with reducing the burden on the user.

Further, by recognizing a part contained in at least one of the first and second medical images and determining the analysis purpose based on the result of recognition, or by determining the analysis purpose based on the associated information added to at least one of the first and second medical images, the user does not need to determine the analysis purpose, and the burden on the user can further be reduced.

Still further, in a case where the composite image is used for comparative reading and a comparative image used for comparison is obtained by an imaging operation other than the dual energy imaging, the composition ratio of the first and second medical images is determined depending on a radiation energy used to obtain the comparative image, instead of determining the composition ratio depending on the determined analysis purpose. In this manner, even when the comparative image is not obtained by dual energy imaging, the composite image can be generated by combining the first and second medical images at a composition ratio that achieves image quality that is equivalent to image quality of an image obtained by imaging using an X-ray having the same energy as that used to obtain the comparative image. Thus, the composite image having image quality that is equivalent to image quality of the comparative image can be obtained, thereby allowing accurate comparative reading using the composite image and the comparative image.

Yet further, in a case where the composite image is used for comparative reading and a comparative image used for comparison is obtained by the dual energy imaging, the composition ratio of the first and second medical images is determined to be the same as a composition ratio used to obtain the comparative image, instead of determining the composition ratio depending on the determined analysis purpose. Then, the composite image can be generated by combining the first and second medical images at the same composition ratio as that used to generate the comparative image. Thus, the composite image having image quality that is equivalent to image quality of the comparative image can be obtained, thereby allowing accurate comparative reading using the composite image and the comparative image.

DESCRIPTION OF THE PREFERRED EMBODIMENTS

Figure 1:
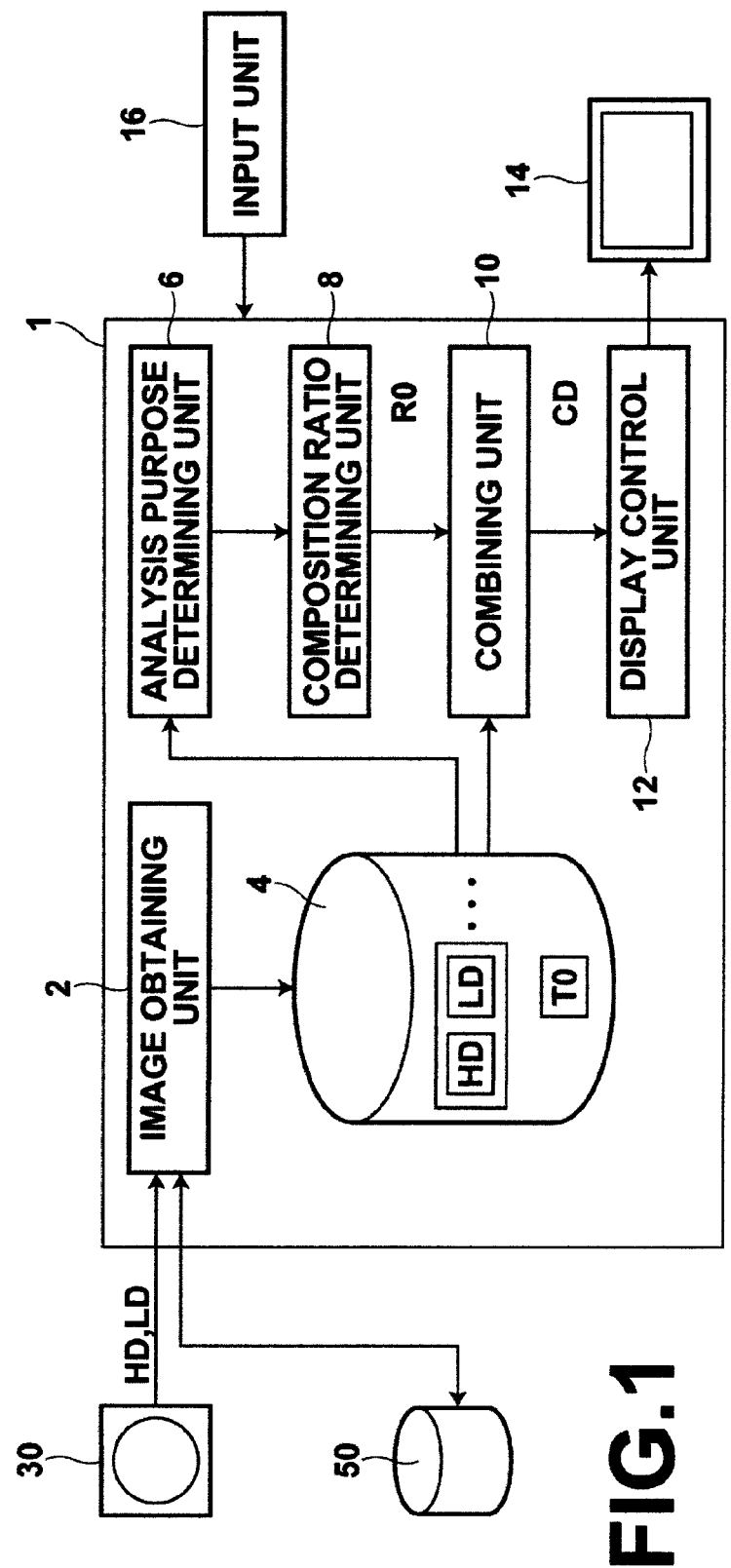
FIG. 1 is a schematic block diagram illustrating the configuration of a medical image processing apparatus according to a first embodiment of the invention.

Hereinafter, embodiments of the present invention will be described with reference to the drawings. FIG. 1 is a schematic block diagram illustrating the configuration of a medical image processing apparatus according to a first embodiment of the invention. It should be noted that the configuration of the medical image processing apparatus 1 shown in FIG. 1 is implemented by executing a medical image processing program, which is read in an auxiliary storage device of a computer, on the computer. The medical image processing program is stored in a storage medium, such as a CD-ROM, or is distributed over a network, such as the Internet, to be installed on the computer.

The medical image processing apparatus 1 according to the first embodiment includes an image obtaining unit 2, a storage unit 4, an analysis purpose determining unit 6, a composition ratio determining unit 8, a combining unit 10, a display control unit 12, a display unit 14 and an input unit 16.

The image obtaining unit 2 has a function of a communication interface, which obtains, via a LAN, a high-energy tomographic image HD and a low-energy tomographic image LD forming a three-dimensional image represented by three-dimensional volume data, which is obtained by carrying out dual energy imaging at an X-ray tomographic apparatus (X-ray CT apparatus) 30. It should be noted that the high-energy tomographic image HD and the low-energy tomographic image LD are sent from the X-ray tomographic apparatus 30 via the LAN. Further, the image obtaining unit 2 obtains various images used for comparison in comparative reading, which will be described later, from an image information database 50 via the LAN, and sends image data of a composite image, which is obtained as described later, to the image information database 50 via the LAN.

The storage unit 4 is a large-capacity storage device, such as a hard disk, and stores image data of the high-energy tomographic image HD and the low-energy tomographic image LD. In the following description, the high-energy tomographic image HD and the low-energy tomographic image LD may be collectively referred to as dual energy tomographic images HD and LD. It should be noted that the storage unit 4 stores the dual energy tomographic images HD and LD of different subjects (i.e., different patients), or of the same subject taken at different imaging times. The storage unit 4 also stores a composition ratio table T0, which will be described later.

Figures 2, 3:
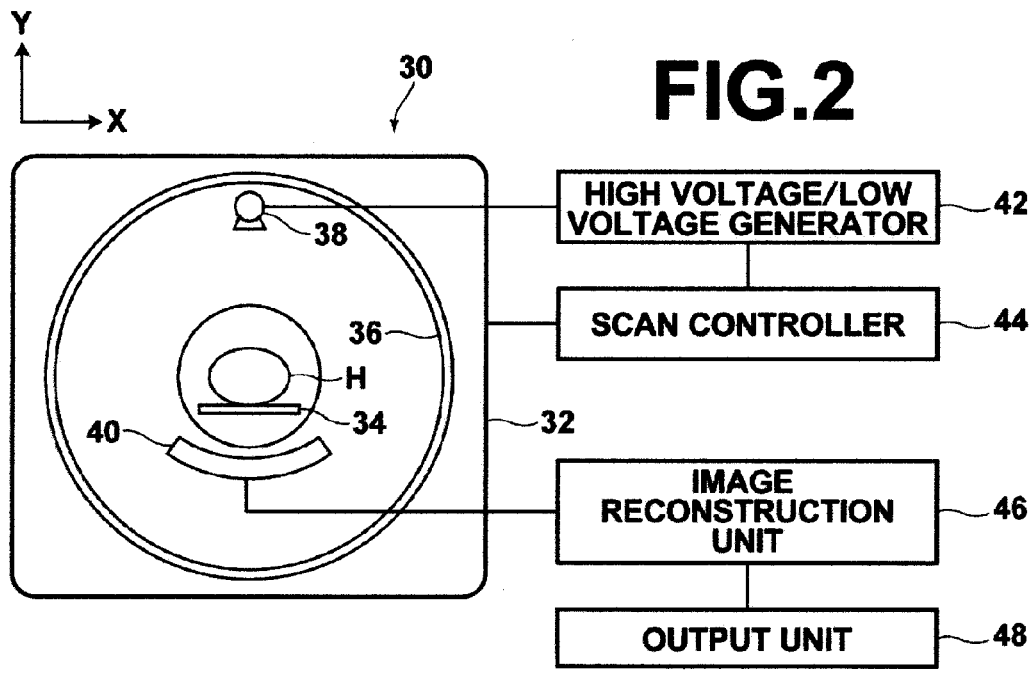
FIG. 2 is a schematic block diagram illustrating the configuration of an X-ray tomographic apparatus.
FIG. 3 is a diagram illustrating a composition ratio table.

FIG. 2 is a schematic block diagram illustrating the configuration of the X-ray tomographic apparatus 30. The X-ray tomographic apparatus 30 includes a gantry 32 and a bed 34 for inserting a subject H in an imaging area of the gantry 32. The bed 34 moves in the Z-direction (a direction perpendicular to the plane of the drawing), which is the body axis direction of the subject H. The gantry 32 includes a rotating ring 36, where an X-ray tube 38 for emitting an X-ray having a cone beam shape and an X-ray detector 40 disposed to face the X-ray tube 38 are attached to the rotating ring 36. The X-ray tube 38 is adapted to emit an X-ray having a high energy spectrum and an X-ray having a low energy spectrum depending on a voltage applied thereto. The X-ray detector 40 detects the X-ray transmitted through the subject H.

The X-ray detector 40 is formed by a scintillator and a photodiode. The X-ray detector 40 records a projection image of the subject H formed by the X-ray transmitted through the subject H and applied to the detector, and outputs projection data representing the projection image.

The X-ray tomographic apparatus 30 includes a high voltage/low voltage generator 42 and a scan controller 44. The high voltage/low voltage generator 42 periodically generates a high voltage and a low voltage (for example, 140 kV and 80 kV) to supply the high voltage and the low voltage to the X-ray tube 38. The tube voltages are not limited to 140 kV and 80 kV, and may be a combination of any voltages.

The scan controller 44 achieves a scan pattern, such as axial scan, helical scan, etc. The scan controller 44 rotates the rotating ring 36 via a rotation mechanism (not shown) synchronously with the high voltage/low voltage generator 42 and exerts control relating to dual energy imaging, such as periodically collecting high energy and low energy projection data from the X-ray detector 40.

The X-ray tomographic apparatus 30 further includes an image reconstruction unit 46 and an output unit 48. The image reconstruction unit 46 generates the high-energy tomographic image HD and the low-energy tomographic image LD by reconstructing the images based on the high energy projection data and the low energy projection data obtained by dual energy imaging. The high-energy tomographic images HD and the low-energy tomographic images LD form three-dimensional volume data, which includes layered pieces of two-dimensional tomographic image data sequentially obtained along a direction perpendicular to a slice plane of the subject H.

The output unit 48 has a function of a communication interface to send image data (three-dimensional volume data) of the high-energy tomographic image HD and the low-energy tomographic image LD to the tomographic image processing apparatus 1 via the LAN. It should be noted that the image data of the high-energy tomographic image HD and the low-energy tomographic image LD have associated information defined by the DICOM (Digital Imaging and Communications in Medicine) standard added thereto. The associated information may contain, for example, an image ID for identifying each image data, a patient ID for identifying each subject, an examination ID for identifying each examination, a unique ID (UID) assigned to each image, an examination date and time when each image is generated, a type of modality used in an examination to obtain each image, patient information, such as name, age, sex, etc., of each patient, examined part (imaged part), imaging conditions (such as whether or not a contrast agent is used, a tube voltage, a radiation dose, etc.), a serial number or a collection number assigned to each image when a plurality of images are obtained in a single examination, etc.

The dual energy imaging is achieved, for example, by alternately switching the tube voltage of the X-ray tube 38 between 140 kV and 80 kV. The tube voltage is switched for every view, every several views, or every scan.

One scan is achieved by a full scan or a half scan. The full scan is achieved by rotating the X-ray tube 38 and the X-ray detector 40 by an angle of 360 degrees. The half scan is achieved by rotating the X-ray tube 38 and the X-ray detector 40 by an angle of 180+γ degrees. It should be noted that "γ" is an open angle of the X-ray emitted from the X-ray tube 38 in the x-y plane. The scan may also be achieved in a unit of segment scan by dividing 360 degrees or 180 degrees with an integer.

It should be noted that, instead of switching the tube voltage of the X-ray tube 38, two groups of the X-ray tube 38 and the X-ray detector 40 may be provided, where one group is provided with a tube voltage of 80 kV and the other group is provided with a tube voltage of 140 kV, to achieve the dual energy imaging by simultaneously applying the X-rays from the two groups. In this case, directions of application of the X-rays from the two groups may differ, for example, by an angle of 90 degrees.

By the dual energy imaging, two types of projection data corresponding to the two types of X-rays having different energies are obtained. One of the two types of projection data is data obtained with the X-ray having the maximum energy of 80 keV, and the other is data obtained with the X-ray having the maximum energy of 140 keV.

Further, by reconstructing the projection data, the two types of tomographic images can be obtained. Pixel values of one of the two types of tomographic images are pixel values (CT values) obtained with the X-ray having the maximum energy of 80 keV, and pixel values the other tomographic image are pixel values obtained with the X-ray having the maximum energy of 140 keV. In this embodiment, the former tomographic image is referred to as the low-energy tomographic image LD, and the latter tomographic image is referred to as the high-energy tomographic image HID. Further, the high-energy tomographic image HD and the low-energy tomographic image LD are collectively referred to as the dual energy tomographic images HD and LD.

Returning to FIG. 1, the analysis purpose determining unit 6 determines the analysis purpose of the dual energy tomographic images HD and LD. In this embodiment, the analysis purpose determining unit 6 recognizes a part contained in at least one of the high-energy tomographic image HD and the low-energy tomographic image LD, and determines the analysis purpose depending on the result of the part recognition. For example, the analysis purpose is determined such that, if the recognized part is the liver, the analysis purpose is liver analysis, or if the recognized part is the lung field, the analysis purpose is lung analysis. It should be noted that the determination of the analysis purpose may be achieved by storing a table, which associates each recognized part with each analysis purpose in the storage unit 4, and referencing the table to determine the analysis purpose.

The part recognition may be achieved using a technique disclosed, for example, in U.S. Patent Application Publication No. 20080267481. The technique disclosed in U.S. Patent Application Publication No. 20080267481 involves normalizing inputted tomographic images, calculating a number of feature quantities from the normalized tomographic images, inputting the feature quantities calculated for each normalized tomographic image to a classifier obtained by using an AdaBoost technique to calculate, for each part, a score indicating a likelihood of being the part, and determining the part shown in the tomographic image based on the calculated part scores using dynamic programming so that the order of the body parts of a human body is maintained. Further, a method using template matching (see, for example, Japanese Unexamined Patent Publication No. 2002-253539) or a method using eigenimages of each part (see, for example, U.S. Pat. No. 7,245,747) may be used.

Alternatively, the analysis purpose determining unit 6 may determine the analysis purpose using the associated information of the dual energy tomographic images HD and LD. As described above, the image data of the dual energy tomographic images HD and LD have the associated information defined by the DICOM standard added thereto, and the associated information contains information of the examined part. Therefore, the analysis purpose determining unit 6 may obtain the information of the examined part from the associated information added to the dual energy tomographic images HD and LD, and may determine the analysis purpose based on this information. Further alternatively, the analysis purpose may be determined according to the analysis purpose inputted by the user via the input unit 16. In this case, an input screen for allowing the user to input the analysis purpose is displayed on the display unit 14, and the user inputs the analysis purpose on the input screen.

The composition ratio determining unit 8 determines a composition ratio R0 of the high-energy tomographic image HD and the low-energy tomographic image LD depending on the analysis purpose determined by the analysis purpose determining unit 6 with referencing a composition ratio table T0. FIG. 3 is a diagram illustrating the composition ratio table. As shown in FIG. 3, in the composition ratio table T0, each of various analysis purposes, such as bone extraction, liver extraction and lung analysis, are recorded with being associated with corresponding weighting factors $\alpha$ and $\beta$ for combining the high-energy tomographic image HD and the low-energy tomographic image LD. The relationship between the weighting factors $\alpha$ and $\beta$ in the composition ratio table T0 satisfies $\alpha=1-\beta$.

The weighting factors $\alpha$ and $\beta$ represent weights for the high-energy tomographic image HD and the low-energy tomographic image LD, respectively, for combining the high-energy tomographic image HD and the low-energy tomographic image LD by adding up corresponding pixel values (i.e., CT values) of the high-energy tomographic image HD and the low-energy tomographic image LD. For example, if the analysis purpose is liver extraction, the weighting factors $\alpha$ and $\beta$ for the high-energy tomographic image HD and the low-energy tomographic image LD in the composition ratio table T0 shown in FIG. 3 are 70% and 30%, respectively. Therefore, if the analysis purpose is liver extraction, the weighting factors $\alpha$ and $\beta$ of 70% and 30%, respectively, can be obtained by referencing the composition ratio table T0. In this manner, the composition ratio determining unit 8 determines the composition ratio R0 of 7:3 for the high-energy tomographic image HD and the low-energy tomographic image LD.

The combining unit 10 carries out weighted addition of the high-energy tomographic image HD and the low-energy tomographic image LD according to the composition ratio R0 determined by the composition ratio determining unit 8 to generate a composite image CD. Specifically, the composite image CD is generated by addition of the high-energy tomographic image HD and the low-energy tomographic image LD based on the composition ratio R0 according to the equation below:

$$CD=\alpha \cdot HD+\beta \cdot LD \quad (1)$$

The combining unit 10 stores image data of the composite image CD in the storage unit 4. The image data of the composite image CD may be sent to the image information database 50 via the image obtaining unit 2 over the LAN to be stored in the image information database 50. At this time, associated information based on the DICCM standard is added to the composite image CD. The associated information of the composite image CD includes information of the composition ratio R0 of the high-energy tomographic image HD and the low-energy tomographic image LD.

The display control unit 12 displays the composite image CD on the display unit 14. At this time, MIP display of a structure of interest contained in the composite image CD, which depends on the analysis purpose determined when the composite image CD is generated, may be carried out using a method, such as the maximum intensity projection (NIP) and minimum intensity projection (MinIP), or volume rendering (VR) display (i.e., pseudo three-dimensional display) of the structure of interest may be carried out. Further, a two-dimensional image at a slice position of interest may be displayed.

The display unit 14 is formed by a known display device, such as a liquid crystal display.

The input unit 16 is formed by a known input device, such as a keyboard and a mouse.

Figure 4:
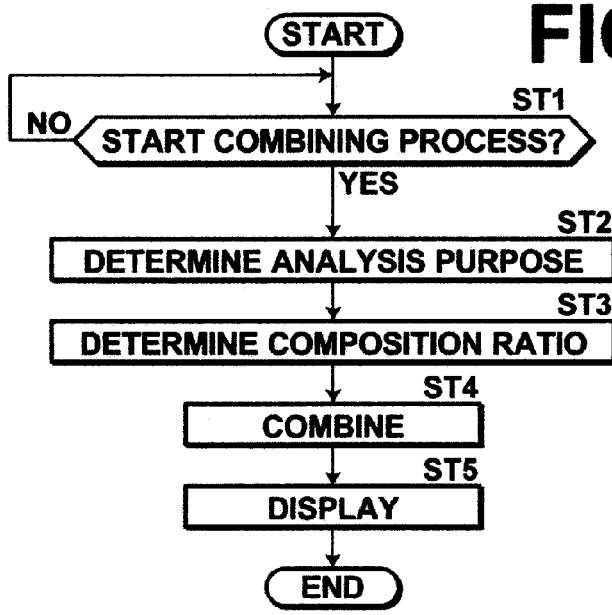
FIG. 4 is a flow chart illustrating a process carried out in the first embodiment.

Next, a process carried out in the first embodiment is described. FIG. 4 is a flow chart illustrating the process carried out in the first embodiment. It is assumed here that the dual energy tomographic images HD and LD have been obtained at the X-ray tomographic apparatus 30 and stored in the storage unit 4.

When the user inputs an instruction to start the combining process to the tomographic image processing apparatus 1 via the input unit 16 (step ST1: YES), the analysis purpose determining unit 6 determines the analysis purpose of the dual energy tomographic images HD and LD (step ST2). Then, the composition ratio determining unit 8 determines the composition ratio R0 of the high-energy tomographic image HD and the low-energy tomographic image LD with referencing the composition ratio table T0 stored in the storage unit 4 (step ST3). Further, the combining unit 10 combines the high-energy tomographic image HD and the low-energy tomographic image LD at the determined composition ratio R0 to generate the composite image CD (step ST4), the display control unit 12 displays the composite image CD on the display unit 14 (step ST5), and the process ends.

As described above, in the first embodiment, the analysis purpose determining unit 6 determines the analysis purpose of the dual energy tomographic images HD and LD, the composition ratio determining unit 8 determines the composition ratio R0 of the high-energy tomographic image HD and the low-energy tomographic image LD depending on the determined analysis purpose with referencing the composition ratio table T0, and the combining unit 10 combines the high-energy tomographic image HD and the low-energy tomographic image LD at the determined composition ratio R0 to generate the composite image CD. Therefore, the user does not need to change the composition ratio by trial and error, or to select a desired composite image from composite images generated at different composition ratios. In this manner, the composite image CD can be obtained in a simple manner with reducing the burden on the user.

Further, by recognizing a part contained in the dual energy tomographic images HD and LD and determines the analysis purpose based on the result of recognition, or by determining the analysis purpose based on the associated information added to the dual energy tomographic images HD and LD, the user does not need to determine the analysis purpose, and the burden on the user can further be reduced.

When the composite image CD is obtained, comparative reading for follow-up may be performed using another image previously obtained by imaging the same patient. In the case where a comparative image used for comparison is a composite image that was generated from dual energy tomographic images, it is preferred that the composition ratio R0 of the composite image CD to be generated is the same as the composition ratio of the comparative image. On the other hand, in the case where the comparative image is not a composite image, i.e., is an image obtained by application of an X-ray with a single energy, it is preferred to determine the composition ratio R0 with considering the tube voltage used to image the comparative image. Now, generation of the composite image in the case where comparative reading is performed is described as a second embodiment.

Figure 5:
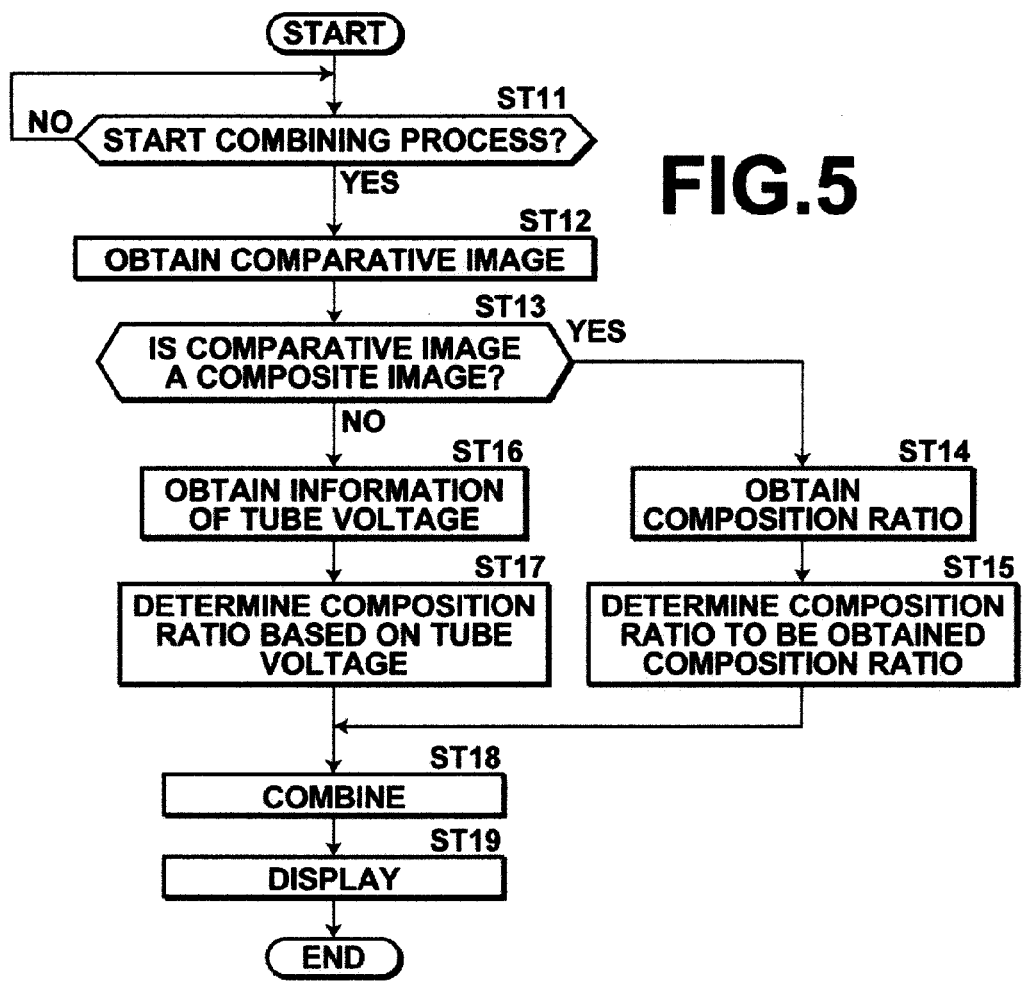
FIG. 5 is a flow chart illustrating a process carried out in a second embodiment.

FIG. 5 is a flow chart illustrating a process carried out in the second embodiment. It is assumed here that an image used for comparison has been selected by the user, and the dual energy tomographic images HD and LD used to generate the composite image CD have been stored in the storage unit 4. When the user inputs an instruction to start the combining process to the tomographic image processing apparatus 1 via the input unit 16 (step ST11: YES), the image obtaining unit 2 obtains a comparative image K0 used for comparison from the image information database 50 (step ST12). Then, the composition ratio determining unit 8 determines whether or not the comparative image K0 is a composite image, which was generated by combining dual energy tomographic images HD and LD, based on the associated information of the comparative image K0 (step ST13).

If an affirmative determination is made in step ST13, the composition ratio determining unit 8 obtains the composition ratio from the associated information added to the comparative image K0 (step ST14), and determines the composition ratio R0 of the dual energy tomographic images HD and LD to be the same as the composition ratio of the comparative image K0 (step ST15).

If a negative determination is made in step ST13, the composition ratio determining unit 8 obtains information of the tube voltage of the X-ray source during imaging of the comparative image K0 from the associated information added to the comparative image K0 (step ST16). Then, the composition ratio R0 of the high-energy tomographic image HD and the low-energy tomographic image LD is determined based on the information of the tube voltage (step ST17).

In this embodiment, the high-energy tomographic image HD and the low-energy tomographic image LD are obtained using X-rays emitted from X-ray tubes with the tube voltages of 140 kV and 80 kV, respectively. Therefore, by appropriately determining the composition ratio R0 of the high-energy tomographic image HD and the low-energy tomographic image LD, a composite image having image quality that is substantially equivalent to an image obtained using an X-ray emitted from an X-ray tube having a single tube voltage can be generated. For example, if the tube voltage during imaging of the comparative image K0 is 110 kV, image quality of the composite image CD that is equivalent to image quality of an image obtained with an X-ray with the tube voltage of 110 kV can be achieved by generating the composite image CD at a 7:3 composition ratio R0 of the high-energy tomographic image HD and the low-energy tomographic image LD.

Subsequently to step ST15 or ST17, the combining unit 10 combines the high-energy tomographic image HD and the low-energy tomographic image LD at the determined composition ratio R0 to generate the composite image CD (step ST18), the display control unit 12 displays the composite image CD and the comparative image K0 on the display unit 14 (step ST19), and the process ends.

As described above, in the second embodiment, in the case where the composite image CD is used for comparative reading, and the comparative image K0 is not a composite image generate from dual energy tomographic images HD and LD, the composition ratio R0 is determined based on the tube voltage during imaging of the comparative image K0. In this manner, even when the comparative image K0 is not a composite image generate from dual energy tomographic images HD and LD, the composite image CD can be generated by combining the high-energy tomographic image HD and the low-energy tomographic image LD at a composition ratio that achieves image quality that is equivalent to image quality of an image obtained by imaging using an X-ray having the same tube voltage as that used to obtain the comparative image K0. Thus, the composite image CD having image quality that is equivalent to image quality of the comparative image K0 can be obtained, thereby allowing accurate comparative reading using the composite image CD and the comparative image K0.

Further, in the case where the comparative image is a composite image generate from dual energy tomographic images HD and LD, the composition ratio R0 of the dual energy tomographic images HD and LD is determined to be the same as the composition ratio used to obtain the comparative image K0, and the dual energy tomographic images HD and LD are combined at the same composition ratio as that used to generate the comparative image K0 to obtain the composite image CD. Thus, the composite image CD having image quality that is equivalent to image quality of the comparative image K0 can be obtained, thereby allowing accurate comparative reading using the composite image CD and the comparative image K0.

In the above-described first and second embodiments, in the case where the dual energy tomographic images HD and LD are obtained by imaging the entire body, the dual energy tomographic images HD and LD are used for several analysis purposes, and therefore the analysis purpose determining unit 6 cannot determine the analysis purpose. In this case, the composition ratio determining unit 8 may determine the composition ratio to be a predetermined composition ratio, such as a composition ratio defined in the topmost row of the composition ratio table T0.

Further, although the analysis purpose determining unit 6 determines the analysis purpose when an instruction to start the combining process is fed in the above-described first and second embodiments, the analysis purpose determining unit 6 may determine the analysis purpose when the high-energy tomographic image HD and the low-energy tomographic image LD are obtained by the image obtaining unit 2, and the determined analysis purpose may be stored in the storage unit 4. With this, the process to generate the composite image CD can be achieved more rapidly.

Still further, although the composite image CD is generated from the high-energy tomographic image HD and the low-energy tomographic image LD formed by the three-dimensional volume data, the composite image CD may be generated only from two-dimensional images at a corresponding slice position of the high-energy tomographic image HD and the low-energy tomographic image LD. In this case, the determination of the analysis purpose based on a recognized part contained in the images may be achieved only using the two-dimensional images.

What is claimed is:

1. A medical image processing apparatus comprising:
   analysis purpose determining means for determining an analysis purpose of first and second medical images, the first and second medical images being obtained by carrying out dual energy imaging using two types of radiations having different energies;
   composition ratio storage means for storing a composition ratio table indicating different composition ratios of the first and second medical images associated with different analysis purposes;
   composition ratio determining means for determining a composition ratio of the first and second medical images depending on the determined analysis purpose with referencing the composition ratio table; and
   combining means for combining the first and second medical images at the determined composition ratio to generate a composite image.

2. The medical image processing apparatus as claimed in claim 1, wherein the analysis purpose determining means recognizes a part contained in at least one of the first and second medical images, and determines the analysis purpose based on a result of the recognition.

3. The medical image processing apparatus as claimed in claim 1, wherein the analysis purpose determining means obtains associated information added to at least one of the first and second medical images, and determines the analysis purpose based on the associated information.

4. The medical image processing apparatus as claimed in claim 1, wherein, in a case where the composite image is used for comparative reading and a comparative image used for comparison is obtained by an imaging operation other than the dual energy imaging, the composition ratio determining means determines the composition ratio of the first and second medical images depending on a radiation energy used to obtain the comparative image, instead of determining the composition ratio depending on the determined analysis purpose.

5. The medical image processing apparatus as claimed in claim 1, wherein, in a case where the composite image is used for comparative reading and a comparative image used for comparison is obtained by the dual energy imaging, the composition ratio determining means determines the composition ratio of the first and second medical images to be the same as a composition ratio used to obtain the comparative image, instead of determining the composition ratio depending on the determined analysis purpose.

6. The medical image processing apparatus as claimed in claim 1, further comprising display control means for carrying out pseudo three-dimensional display of the composite image.

7. A medical image processing method comprising the steps of:
   determining an analysis purpose of first and second medical images, the first and second medical images being obtained by carrying out dual energy imaging using two types of radiations having different energies;
   determining a composition ratio of the first and second medical images depending on the determined analysis purpose with referencing a composition ratio table, the composition ratio table indicating different composition ratios of the first and second medical images associated with different analysis purposes; and
   combining the first and second medical images at the determined composition ratio to generate a composite image.

8. A non-transitory computer-readable recording medium containing a medical image processing program for causing a computer to carry out the steps of:
   determining an analysis purpose of first and second medical images, the first and second medical images being obtained by carrying out dual energy imaging using two types of radiations having different energies;
   determining a composition ratio of the first and second medical images depending on the determined analysis purpose with referencing a composition ratio table, the composition ratio table indicating different composition ratios of the first and second medical images associated with different analysis purposes; and
   combining the first and second medical images at the determined composition ratio to generate a composite image.

* * * * *